US012584393B2

(12) United States Patent
Hunter

(10) Patent No.: US 12,584,393 B2
(45) Date of Patent: Mar. 24, 2026

(54) METHODS FOR CONDUCTING A PRESSURE TEST, AND SYSTEMS RELATING THERETO

(71) Applicant: Halliburton Energy Services, Inc., Houston, TX (US)

(72) Inventor: Timothy Holiman Hunter, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 392 days.

(21) Appl. No.: 18/233,747

(22) Filed: Aug. 14, 2023

(65) Prior Publication Data

US 2025/0059868 A1     Feb. 20, 2025

(51) Int. Cl.
*E21B 43/26*          (2006.01)
*E21B 47/117*         (2012.01)
*G01N 3/12*           (2006.01)

(52) U.S. Cl.
CPC .......... *E21B 43/2607* (2020.05); *G01N 3/12* (2013.01); *G01N 2203/0048* (2013.01)

(58) Field of Classification Search
CPC ..... E21B 43/2607; E21B 47/117; G01N 3/12; G01N 2203/0048
See application file for complete search history.

(56) References Cited

U.S. PATENT DOCUMENTS

| | | | |
|---|---|---|---|
| 5,092,162 A | 3/1992 | Self | |
| 5,623,910 A | 4/1997 | Riggle | |
| 7,234,529 B2 | 6/2007 | Surjaatmadja | |
| 8,230,875 B2 | 7/2012 | Norman | |
| 11,237,076 B2 | 2/2022 | Mazrooee et al. | |
| 11,293,227 B2 | 4/2022 | Brunet | |
| 2013/0092261 A1 | 4/2013 | Andersson | |
| 2021/0063271 A1* | 3/2021 | Mazrooee | E21B 43/26 |

* cited by examiner

*Primary Examiner* — Laura Martin
*Assistant Examiner* — Anthony W Megna Fuentes
(74) *Attorney, Agent, or Firm* — Conley Rose, P.C.; Rodney B. Carroll

(57)     ABSTRACT

A method of conducting a pressure test on a piping and manifold system can include connecting a plurality of pumping units to a discharge manifold, connecting the wellhead of a well to the discharge manifold via a wellhead flowline, isolating the wellhead from fluid flow into the well to form a closed test system, and operating at least one and less than all of the plurality of pumping units to pressurize the closed test system to a predetermined pressure.

21 Claims, 5 Drawing Sheets

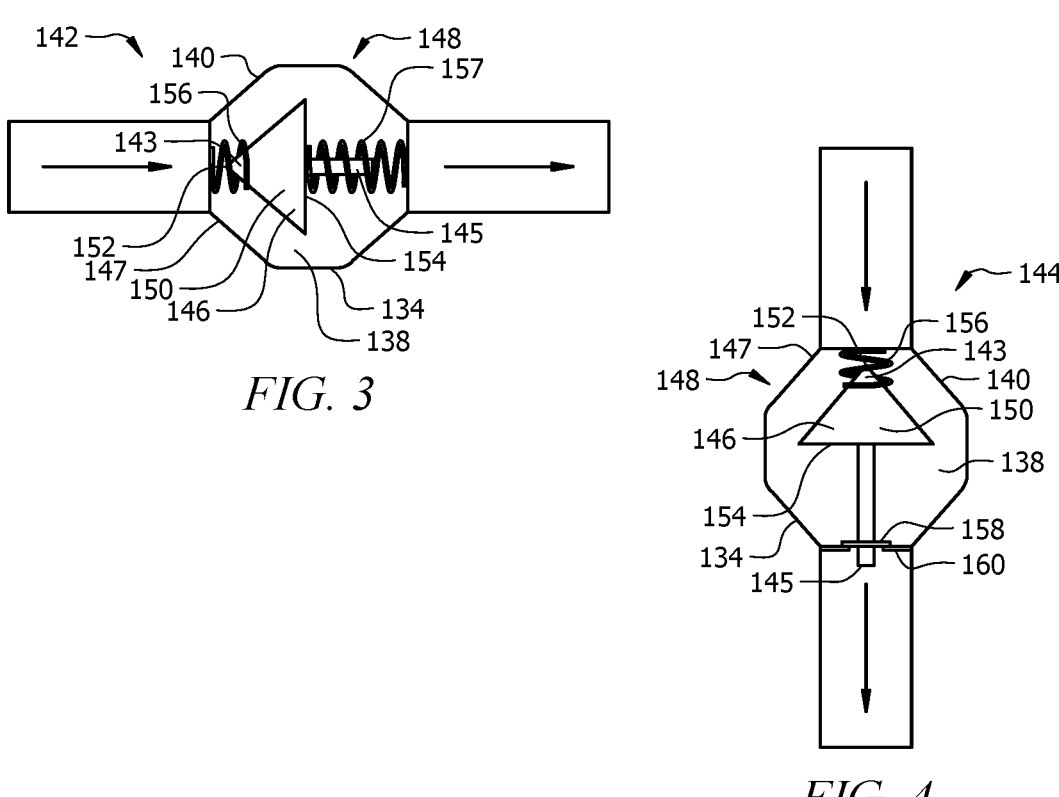
*FIG. 3*
*FIG. 4*
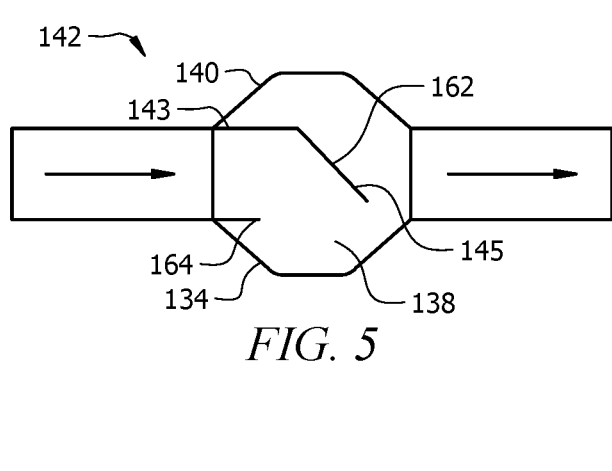
*FIG. 5*
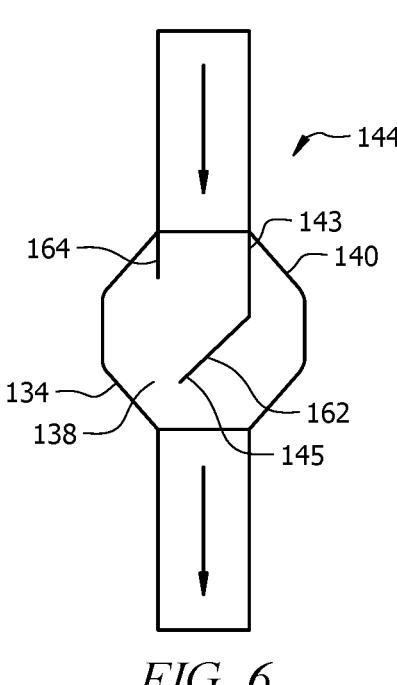
*FIG 6*

PERFORMING A PRESSURE CYCLE THAT INCLUDES:          ~ 180

PRESSURIZING THE PUMPING AND PIPING MANIFOLD          ~ 182

MONITORING ONE OR MORE MEASURED PRESSURES          ~ 184

DETERMINING WHETHER A PRESSURE LOSS INDICATES DETECTION OF A LEAK          ~ 186

METHODS FOR CONDUCTING A PRESSURE TEST, AND SYSTEMS RELATING THERETO

FIELD

This application relates to methods of conducting a pressure test of surface equipment at a wellsite, and systems relating thereto. More specifically, this application relates to methods of conducting a pressure test by operating at least one and less than all of a plurality of pumping units to pressurize an isolated fluid distribution isolated system.

BACKGROUND

At a wellsite, several phases of drilling and completion operations are typically conducted, such as drilling, cementing, treating, producing, and secondarily treating, such as hydraulic fracturing treatments. Well stimulation, including fracturing, can be utilized by the oil and gas industry to increase the transfer of hydrocarbon resources from a reservoir formation to a wellbore. Pressurized fracturing fluid is introduced into a wellbore to generate fractures downhole in the reservoir formation. Typically, these pressures exceed the fracture gradient of the subterranean formation, and thus, place stress on the piping and equipment subject to these high operating pressures.

Periodically, in any of these phases, the piping and equipment used at a wellsite to conduct a job (e.g., fracturing operations) can be subject to pressure testing to determine if there are any leaks. Due to the particularly high pressures utilized during fracturing, pressure testing can be conducted to ensure the reliability of the equipment and for the protection of personnel. Thus, an ongoing need exists for improved systems and methods for performing pressure testing of fluid flow piping and equipment at a wellsite.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 3 is a cross-sectional schematic of an embodiment of a velocity fuse in a substantially horizontal orientation.

FIG. 4 is a cross-sectional schematic of an embodiment of a velocity fuse in a substantially vertical orientation.

FIG. 5 is a cross-sectional schematic of another embodiment of a velocity fuse in a substantially horizontal orientation.

FIG. 6 is a cross-sectional schematic of another embodiment of a velocity fuse in a substantially vertical orientation.

DETAILED DESCRIPTION

Figure 1:
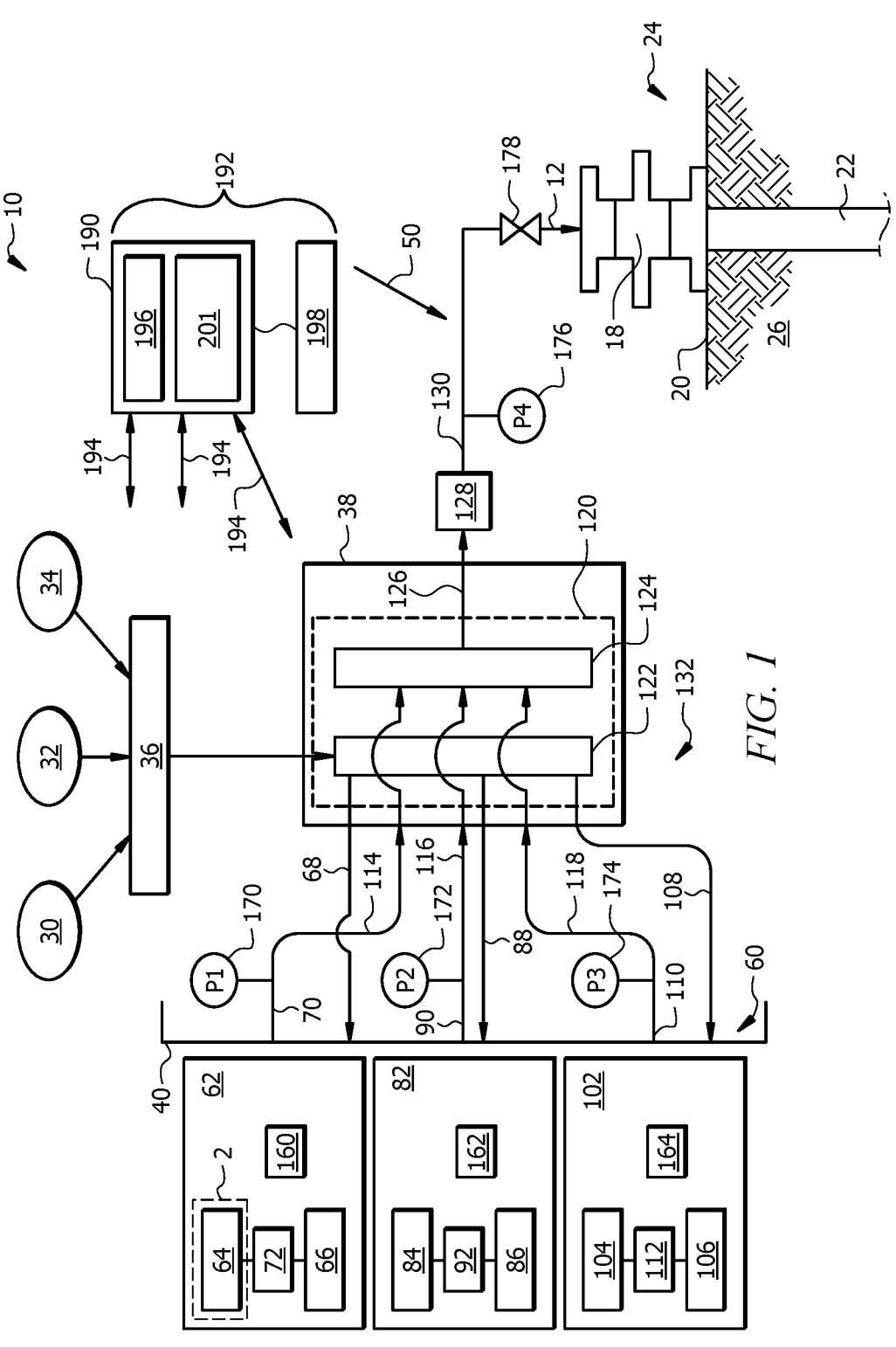
FIG. 1 is a schematic block diagram of an embodiment of a wellbore operational environment for conducting a pressure test.

In the following detailed description of the illustrative embodiments, reference is made to the accompanying drawings that form a part hereof. These embodiments are described in sufficient detail to enable those skilled in the art to practice the invention, and it is understood that other embodiments may be utilized, and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

As used herein, the term "fluid path" can be a path for the flow of fluid (i) from equipment such a pumping unit into a wellbore and can be used for the injection of fluids, such as fracturing fluids, and (ii) from a wellbore to equipment such as treatment vessels and can be used for the production of fluids such as hydrocarbons and water. The term "fluid path" may be used interchangeably with "line", "flowline", or "pipe" with respect to the drawings. Moreover, the terms "flowline", "pipe", and "line" may be used interchangeably.

As used herein, the term "pumping and piping manifold" or "piping and manifold system" can mean a zone of piping and equipment providing a fluid path to/from equipment and a well (e.g., wellhead), and capable of forming an isolated or closed system subject to pressurized fluid and pressure testing. This zone can include the discharges from one or more pumps, one or more manifolds, and piping to one or more valves isolating one or more respective wellheads. In the field, this zone may be referred to as a "frac-iron" or "frac-iron configuration" subject to high pressures during operations. Although the term "iron" may be utilized to describe the equipment and piping, such as the frac-iron, the equipment may be made from iron or any other suitable material other than iron depending on the type of operation.

As used herein, the term "fluid" may be a liquid or a gas, and includes an aqueous fluid that can be used during a pressure test.

As used herein, the term "at least one pumping unit and less than all of the plurality of pumping units" may be used to distinguish operating pumping units and non-operating pumping units. As an example, a number, such as one, of operating pumping units may be less than the total number of pumping units. As another example, one operating pumping unit for pressurizing a pumping and piping manifold can be one pumping unit of four pumping units with the other three pumping units being non-operating.

As used herein, the term "system" can include an oilfield platform or hydraulic fracturing spread including piping, one or manifolds, equipment, one or more fluids, one or more valves, one or more sensors, and a computer system for conducting one or more wellbore operations. The system can include a plurality of pumping units configured for fluid communication via frac-iron with one or more wellheads located at a wellsite.

As used herein, the term "fluid distribution system" can be a group of interrelated elements for distributing a fluid and can include one or more fluid sources, one or more lines, pipes, pumps, manifolds, and valves.

As used herein, the term "computer system" can be a group of interrelated elements acting to a set of rules and include one or more processors, memories, network interfaces, controllers, sensors, and buses for controlling or automating one or more wellbore operations.

As used herein, the term "isolated system" or "closed test system" or "test shut-in system" and the like can mean an enclosed space permitting fluid entry, but not fluid exit except for intermittent purging of some liquids, to allow an increase in pressure for, in some embodiments, pressure testing, and can be accomplished for piping and equipment by, e.g., closing a valve, to, e.g., a wellbore. In an aspect, an isolated test system comprises the manifold 120 and all related piping providing a fluid path from a plurality of pumping units 62/82/102 to valve 178 associated with wellhead 18.

As used herein, the term "pumping unit" can include at least one pump and motor. In some instances, two or more pumps can be powered by a single motor. Generally, a pumping unit has a single motor.

As used herein, the term "network" or "piping network" can include lines or pipes extending to and from a manifold.

As used herein, the term "manifold" can be interconnected lines or pipes for distributing a fluid to different locations.

As used herein, the term "velocity fuse" can be a device that activates after a flow threshold is achieved to block fluid flow in a designated direction, typically upstream toward a pumping unit. A velocity fuse generally differs from a check valve as a check valve prevents any flow, such as during upsets or pressure tests, upstream of the valve, while a velocity fuse permits some upstream flow. Also, check valves are typically biased by a biasing member or force (e.g., a spring or hydraulic force) in an open or closed position, whereas some embodiments of velocity fuses do not have a biasing force or member.

As used herein, the term "pressure cycle" can mean a continuous, increasing pressure from an initial pressure (e.g., ambient pressure) to a final pressure for a pressure test with at least one pump or pumping unit.

As used herein, the term "substantially" can mean very similar or at a particular orientation. In some embodiments, substantially, can mean within about 10 degrees, about 9 degrees, about 8 degrees, about 7 degrees, about 6 degrees, about 5 degrees, about 4 degrees, about 3 degrees, about 2 degrees, or about 1 degree with respect to horizontal or vertical.

As used herein, the term "upstream" can be construed as generally toward the pumping units and typically occurs during process upsets and possibly during pressure tests, and the term "downstream" can be construed as generally toward to the wellhead during normal operations, such as fluid fracturing operations.

It is to be understood that "subterranean formation" encompasses both areas below exposed earth and areas below earth covered by water such as ocean or fresh water.

As used herein, the term "and/or" can mean one or more of items in any combination in a list, such as "A and/or B" means "A, B, or the combination of A and B".

During a typical pressure test, all the pumps are used to pressurize a fluid to a target pressure to check for leaks in piping and equipment, particularly the "frac-iron" exposed to high pressures from the pumps' discharge. Often, downstream of each pump is a check valve, typically spring-loaded. During an upset, such as a downstream pressure surge, springs typically close the valves to prevent reverse or upstream flow toward the pumps. Multiple pumps can be connected via check valves to a common manifold to form a system. The manifold system is often tested periodically. To test the entire system, including the pump discharge chambers, pressurized fluid is introduced upstream of each spring-loaded check valve to increase pressure throughout the system. To pressurize the entire frac-iron, all the pumps must be operated as the check valves prevent backward flow from the discharge manifold to the fluid end of the pumps. Any non-operating pumps would not be pressurized at their pump fluid end due to the check valve activating and preventing backward fluid flow. However, pumps can be damaged during pressure tests. It would be beneficial to pressure the system with less than all pumps to minimize wear and damage to the pumps. The presently disclosed systems and method advantageously allow for pressure testing an entire piping and manifold system (e.g., frac-iron of the type used to conduct hydraulic fracturing operations) by operating less than all of the pumping units in fluid communication with the piping and manifold system.

In some embodiments, a method of conducting a pressure test on a piping and manifold system configured to provide fluid flow from a plurality of pumping units into a well via a wellhead. The method comprises connecting the plurality of pumping units to a discharge manifold. A fluid outlet on each of the plurality of pumping units is in fluid communication with the discharge manifold via a discharge flowline. The method further comprises connecting the wellhead of a well to the discharge manifold via a wellhead flowline; isolating the wellhead from fluid flow into the well, by closing, e.g., a valve on or upstream from the wellhead, to form a closed test system; and operating at least one (e.g., just one) and less than all of the plurality of pumping units to pressurize the closed test system to a predetermined pressure. The fluid can flow from the fluid outlet on each operating pumping unit (e.g., just one) through the discharge manifold to the fluid outlet on one or more non-operating pumping units.

In some embodiments, a method of conducting a pressure test comprises isolating a pumping and piping system coupled to a wellhead of a well to form a closed system by closing a valve to prevent fluid flow through the wellhead and into the well. The pumping and piping system comprises respective fluid outlets of a plurality of pumping units, and each of the respective fluid outlets is in fluid communication with a discharge manifold via a discharge flowline. The discharge manifold is coupled to the wellhead via a wellhead flowline. The method further comprises pressuring the closed system to a predetermined pressure with a fluid by operating less than all of the plurality of pumping units. The fluid flows from the operating pumping units through the discharge manifold to one or more non-operating pumping units. Each discharge flowline comprises a velocity fuse located between the discharge manifold and each of the plurality of pumping units.

In some embodiments, a method of performing a pressure test, comprises performing at least one pressure cycle on a fluid distribution system comprising a plurality of pumping units coupled to a wellhead via a manifold; isolating the wellhead to provide an isolated fluid distribution system; and pressurizing the isolated fluid distribution system with a single pump from the plurality of pumping units from an initial test pressure to a final test pressure. Sometimes, the pressurization from the initial test pressure to the final test pressure is for conducting the entire pressure test.

In some embodiments, the fluid distribution system includes a pumping and piping manifold comprising a discharge line having a velocity fuse for each of the plurality of pumping units the manifold, and one or more pipes to an isolation valve upstream of the wellhead. The backflow is permitted during the pressure test from the manifold to at least one fluid outlet for pressure testing. Each pumping unit of the plurality of pumping units includes a respective discharge containing a velocity fuse activated when a flow threshold is exceeded for preventing backflow. Each discharge includes the velocity fuse comprising a poppet centered in a passageway of the discharge, or biased about a center of the passageway. The poppet includes a cone and springs are fitted proximate to a vertex and a base of the cone. Each discharge includes the velocity fuse including a flapper valve centered in a passageway of the discharge. The velocity fuse is orientated substantially vertically or is orientated substantially horizontally.

In some embodiments, the pumping and piping manifold includes the plurality of pumping units in fluid communication with the wellhead via a manifold. The discharge of each pumping unit is in direct fluid communication with the manifold. A single pumping unit is activated for performing the at least one pressure cycle. Each of the plurality of pumping units comprises a motor and at least one pump. The motor includes an electric motor or a diesel engine. The at least one pressure cycle is conducted on a closed system, and a fluid is pressurized and includes an aqueous fluid. The plurality of pumping units and the manifold are above a surface. The single pump is comprised in a pumping unit. The flow threshold is no more than about five gallon per minute (gpm). The predetermined pressure is about 3,000 pounds per square inch, absolute (psi) to about 5,000 psi, and a maximum pressure is up to about 30,000 psi, no more than about 20,000 psi, or about 10,000 psi to about 14,000 psi. The single pump performs the pressure test and the remaining discharges of the pumping and piping manifold are pressurized during the test by backflow below a threshold from the manifold by the single pump.

In some embodiments, a method is provided of preparing a piping and manifold system for a pressure test. The method includes placing a velocity fuse in a flowline connecting a pumping unit (e.g., an electrically driven plunger pump) to a discharge manifold (e.g., a high pressure discharge manifold having a pressure of equal to or greater than about 1,000 psi, about 5,000 psi, about 10,000 psi, or about 15,000 psi). The discharge manifold is connected via a flowline to a wellhead and the wellhead is isolated from the manifold via a closed valve. The piping and manifold system can be part of a hydraulic fracturing spread located at a wellsite and configured to pump high pressure fracturing fluid into the wellbore and surrounding formation.

In some embodiments, a system includes a pumping and piping system coupled to a wellhead of a well to form a closed system by closing a valve to prevent fluid flow through the wellhead and into the well. The pumping and piping system can include respective fluid outlets of a plurality of pumping units, and each of the respective fluid outlets is in fluid communication via a discharge flowline with a discharge manifold coupled via a wellhead flowline to the wellhead. The closed system is pressured to a predetermined pressure with a fluid by operating less than all of the plurality of pumping units. The fluid flows from the operating pumping units through the discharge manifold past a velocity fuse to one or more non-operating pumping units.

A pumping and piping manifold includes a plurality of pumping units in fluid communication with a wellbore via a manifold, wherein each pumping unit comprises a discharge containing a velocity fuse therein. The velocity fuse is open unless a threshold flow is reached.

In some embodiments, the velocity fuse includes a poppet or a flapper valve, or the velocity fuse includes the poppet centrally biased inside a passageway to permit flow in either direction unless a maximum threshold of backward flow is exceeded. The velocity fuse includes a flapper valve biased in an open position unless a maximum threshold of backward flow is exceeded, or the velocity fuse is orientated substantially horizontally or orientated substantially vertically. The plurality of pumping units in fluid communication with wellbore via manifold, and the discharge of each pumping unit is in direct fluid communication with the manifold. Each of the plurality of pumping units includes a motor and at least one pump. The motor includes an electric motor or a diesel engine.

A pumping and piping manifold includes a plurality of pumping units in fluid communication with a wellbore via a manifold. Each pumping unit includes a discharge containing a means for preventing excessive backflow.

In some embodiments, the means for preventing excessive backflow comprises a velocity fuse, which includes a poppet or a flapper valve. The velocity fuse includes the poppet centrally biased inside a passageway to permit flow in either direction unless a maximum threshold of backward flow is exceeded, or the flapper valve biased in an open position unless a maximum threshold of backward flow is exceeded. The velocity fuse is orientated substantially horizontally, or orientated substantially vertically. The plurality of pumping units is in fluid communication with the wellbore via the manifold, and the discharge of each pumping unit is in direct fluid communication with the manifold. Each of the plurality of pumping units comprises a motor, such as an electric motor or a diesel engine, and at least one pump. A hydraulic fracturing spread can include the pumping and piping manifold, as described above.

Referring to FIG. 1, a schematic block diagram of an embodiment of a wellbore operational environment for conducting a pressure test is depicted. A system or hydraulic fracturing spread 10 can include a blender 36, a trailer 38 supporting a manifold 120, a pumping and piping manifold 40, a wellhead 18, and a computer system 190 for employing apparatus, methods, and systems in accordance with embodiments disclosed herein. In some embodiments, the system 10 can be or include an oil and gas platform 10, a hydraulic fracturing spread 10, or a fluid distribution system 10.

The system 10 can optionally be configured for automatic pressure testing, although the pressure testing can be tested manually. As depicted FIG. 1, a well 24 can include a wellbore 22 capped by the wellhead 18 extending from a surface 20, such as the earth's surface, and downward into a subterranean formation 26. The wellbore 22 may include a casing that encloses at least some of the wellbore 22 extending from surface 20 into the subterranean formation 26 to some depth extending away from a top opening of the wellbore 22 at the surface 20. A choke valve comprising one or more connections and/or shut-off valves may be positioned at the top opening, and arranged to couple to the casing and thus seal off the borehole relative to the piping and equipment above surface 20. In some embodiments, a valve 178 may be used to isolate the wellbore 20 to create a closed or shut-in test system 50, and may be operated manually or automatically.

During normal operations, such as fracturing operations, one or more fluids, such as fracturing fluids, are introduced into the subterranean formation 26, as discussed further below.

The system 10 can include a pumping and piping manifold 40 subject to the high pressures during fracturing operations, thus is subjected to pressure testing to ensure viability of piping and equipment. The pumping and piping manifold 40 can include the discharges or fluid outlets 70, 90, and 110 from respective pumping units discussed hereinafter, a manifold 120, and a piping 130 to the valve 178. The manifold 120 can include a low pressure suction manifold 122 and a high pressure discharge manifold 124 supported by the trailer 38. The manifold 120 can have a manifold outlet line 126, which in turn communicates with at least wellhead flowline, one or more lines or one or more pipes 130 with the wellhead 18.

The system 10 can further include one or more or a plurality of pumping units 60, such as a first pumping unit 62, a second pumping unit 82, and a third pumping unit 102.

Figure 2:
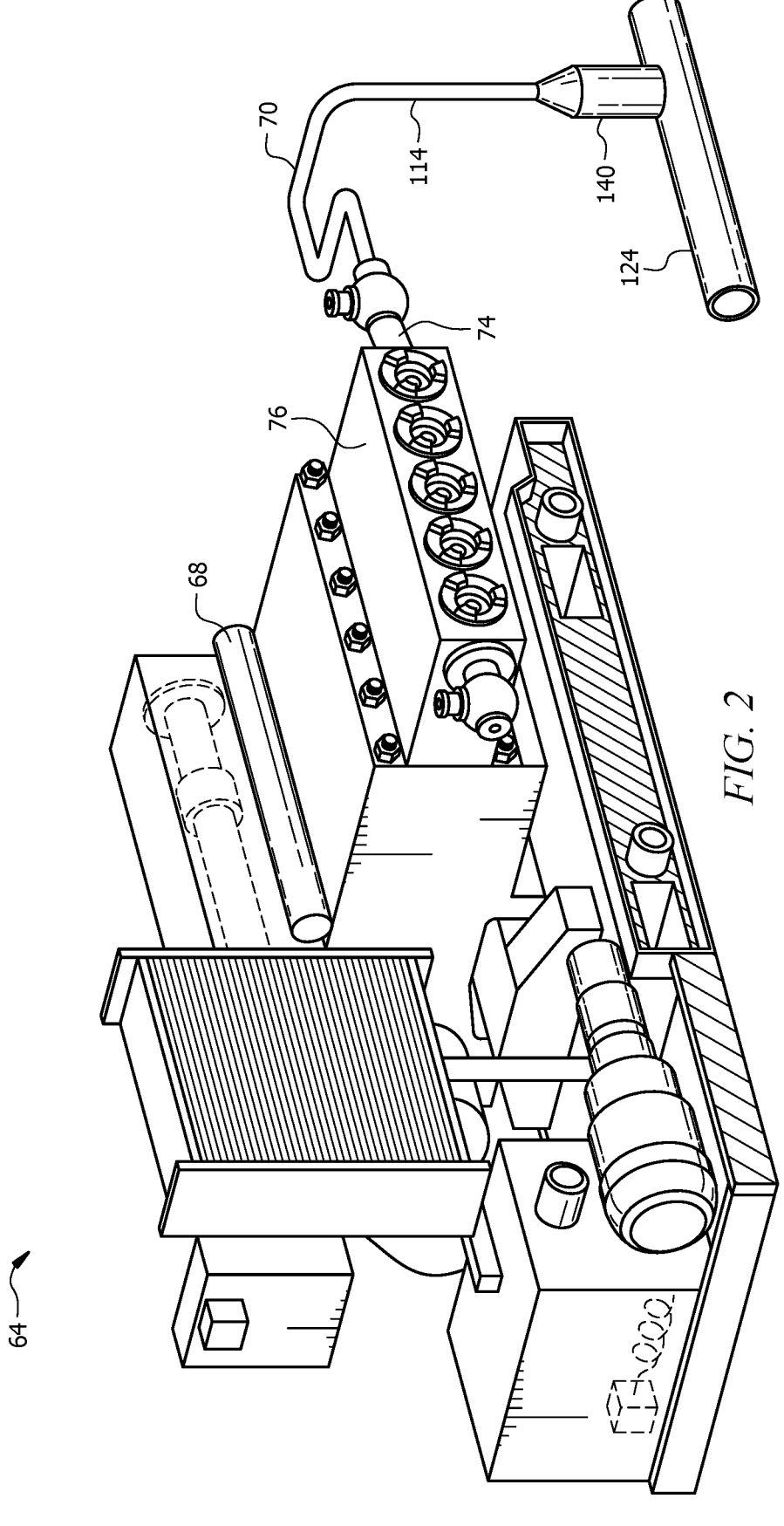
FIG. 2 is a schematic of an embodiment of a pump.

Referring to FIGS. 1-2, the first pumping unit 62 can include at least one pump, such as a first pump 64 and a second pump 66 powered by a motor 72, and a controller 160. Although two pumps 64 and 66 are depicted, any suitable number of pumps, such as one, two, three, four, or more may be included in a first pumping unit 62. Similarly, a second pumping unit 82 can include pumps 84 and 86, a motor 92, and a controller 162, and a third pumping unit 102 can include pumps 104 and 106, a motor 112, and a controller 164. The pumps 64 and 66 can communicate at a common connection with the fluid outlet 70, the pumps 84 and 86 can communicate at a common connection with the fluid outlet 90, and the pumps 104 and 106 can communicate at a common connection with the fluid outlet 110. In some embodiments each pump of the respective pumping unit can have a check valve at or downstream of each pump's fluid outlet. The second pumping unit 82 and third pumping unit 102 can include any suitable number of pumps, similar to the first pumping unit 62. A network 132 of one or more pipes, including suction lines 68, 88, and 108 and discharge or pump lines 114, 116, and 118 can communicate the manifold 120 with the plurality of pumping units 60.

The system 10 can also include a computer system 190 for control and/or automation. The computer system 190 may also include one or more sets of communication links 194 that allow computer system 190 to communicate with other devices included within the system 10. In some embodiments, the computer system 190 can include a display 196, one or more input and/or output devices 198, a processor 201, and the one or more communication links 194, in this exemplary embodiment three communication links 194. The display 196, one or more input and/or output devices 198, and the processor 201 can be comprised in a computer controller 192. The system 10 can also include one or more sensors, such as pressure sensors, 170, 172, 174, and 176, and a control valve 128 downstream of the manifold 120. Each of pressure sensors 170, 172, 174, and 176, may be configured to provide an output, such as an electrical output signal, that is indicative of the pressure level that is present in the respective pump discharges or fluid outlets 70, 90, and 110 or the one or more pipes 130 to which the sensor 176 is coupled. Another embodiment of a computer system 190 is discussed below.

The system 10 may further include sources for fluids and additives for wellbore operations. In some embodiments, the system 10 can include a sand and/or proppant source 30, a pressure test fluid source 32, and one or more additions source 34. The pressure test fluid source 32 can be an aqueous fluid, such as fresh water, surface water, ground water, produced water, salt water, sea water, brine (e.g., underground natural brine, formulated brine, etc.), and combinations thereof. The pressure test fluid source 32 can be provided to the manifold 120. The manifold 120, in turn, can communicate with the plurality of pumping units 60 via suction lines 68, 88, and 108 to respective pumping units 62, 82, and 102.

Referring to FIG. 2, the pump 64 of the pumping unit 62 is depicted in further detail. The pump 64 includes the suction line 68 and the pump fluid end 76 and can be representative of other pumps 66, 84, 86, 104, and 106. Each fluid outlet on the one or more pumping units is in fluid communication with one or more pump fluid ends, e.g., a fluid end having a plurality of reciprocating plungers disposed within corresponding fluid bores such as a triplex plunger pump or a quintuplex plunger pump. The pump fluid end 76 can communicate with the fluid outlet 70 via a portion 74. Downstream of the fluid outlet 70 can be the discharge line 114 coupled to a velocity fuse 140. The velocity fuse 140 can be in turn coupled to the discharge manifold 124.

Several operations or conditions can take place in the system 10. In normal operations, such as fracturing, a fluid flow 12 can be introduced past the open valve 178 near the wellhead 18. Generally, a fracturing fluid from the blender 36 is provided to the low pressure suction manifold 122 to the plurality of pumping units 60. The fracturing fluid passes through the velocity fuses of each respective pump to the discharge manifold 124 and through the wellhead flowline 130 past the open valve 178 through the wellhead 18 and into the wellbore 22 and surrounding subterranean formation 26. If a process upset occurs and flow reverses upstream towards the plurality of pumping units 60, the velocity fuses close, as discussed hereinafter, to prevent flow into the pumps' fluid ends to protect equipment and personnel.

During pressure testing, the valve 178 is closed stopping fluid flow past the wellhead 18 into the subterranean formation 26. An aqueous fluid from the pressure test fluid source 32 is pumped by a pump, such as the pump 64 of the pumping unit 62, while the other pumps 66, 84, 86, 104, and 106 are non-operational. The single pump 64 can pressurize the piping and manifold system 40 as pressurized fluid passes the velocity fuse 140 through the discharge flowline 114 to the discharge manifold 124 and back upstream through discharge flowlines 116 and 118 past respective velocity fuses to pressurize the pump fluid ends of pumps 84 and 86 and 104 and 106 of, respectively, the non-operating pumping units 82 and 102. Similarly, the pump 64 can pressure a communicated pump fluid outlet of the non-operating pump 66 in the pumping unit 62. Unlike a check valve, the pressurized fluid is below the flow threshold for activating the velocity fuses of the non-operating pumps, allowing the pressurization of the entire piping and manifold system 40. Pressure testing may be performed in order to determine if leaks exist in the system 10, and/or to confirm that the system 10 is adequately configured to withstand the maximum fluid pressures that equipment and piping may be exposed during a fracturing process.

In some embodiments, upstream of each fluid outlet includes a velocity fuse located between the pump fluid outlet of each pump and the discharge manifold. The pump fluid outlet upstream of the velocity fuse of each non-operating pump is pressurized to the predetermined pressure. Although the velocity fuse is depicted downstream of the fluid outlet 70, it should be understood that the velocity fuse 40 may be position anywhere downstream of the pump fluid outlet 76 and before the discharge manifold 124. In some embodiments, the fluid outlet 70 can be shared by all the pumps of the pumping unit, and a single velocity fuse may be used for a pumping unit instead of each pump.

Each velocity fuse remains open to fluid flow continuously during the pressure test, or in a direction from the discharge manifold to the pump fluid outlet of each non-operating pump. Each velocity fuse remains at least partially open when there is no fluid flow through the velocity fuse, or remains open if the flow is equal to or less than about 5 gpm, about 4 gpm, about 3 gpm, about 2 gpm, or about 1 gpm fluid flow through the velocity fuse. Each velocity fuse is not biased to an open or closed position by a force other than gravity, is not biased to an open or closed position by a force provided by a biasing member (e.g., a spring), or is biased to a partially open position by a force provided by a biasing member (e.g., a spring).

In some embodiments, each velocity fuse includes a body comprising a sealing surface (e.g., seat) and a moveable sealing member configured to contact the sealing surface in a closed position and not contact the sealing surface in an open or partially open position. The moveable sealing member is a flapper, a dart, or a poppet. Each velocity fuse remains open when there is no differential pressure across the sealing surface and the moveable sealing member. Each velocity fuse has a first end and a second end, wherein the velocity fuse is arranged in a substantially vertical orientation. The first end is above the second end, and wherein the first end is in fluid communication with the fluid outlet of each of the plurality of pumping units and the second end is in fluid communication with the discharge manifold.

In some embodiments, the sealing surface is proximate the first end and above the moveable sealing member. Each velocity fuse has a first end and a second end. The velocity fuse is arranged in a substantially horizontal orientation, and the first end is in fluid communication with the fluid outlet of each of the plurality of pumping units and the second end is in fluid communication with the discharge manifold. The sealing surface is proximate to the first end and between the moveable sealing member and the fluid outlet. At least one of the operating pumping units (e.g., just one) is electrically driven.

During the pressure test, the closed system can be evaluated by monitoring for leakage. After reaching the final predetermined pressure, the final predetermined pressure can be held to monitor the fluid distribution system for leakage.

In some embodiments, an initial predetermined pressure can be at least about 1,000 psi, about 2,000 psi, about 3,000 psi, about 4,000 psi, about 5,000 psi, about 6,000 psi, about 7,000 psi, or about 8,000 psi. In some embodiments, an initial predetermined pressure can be no more than about 1,000 psi, about 2,000 psi, about 3,000 psi, about 4,000 psi, about 5,000 psi, about 6000 psi, about 7,000 psi, or about 8,000 psi. In some embodiments, the initial predetermined pressure is 3,000 psi to about 5,000 psi, about 3,500 psi to about 4,500 psi, or about 3,800 psi to about 4,200 psi.

In some embodiments, a final predetermined pressure is at least about 8,000 psi, about 10,000 psi, about 12,000 psi, about 14,000 psi, about 15,000 psi, about 20,000 psi, or about 25,000 psi. In some embodiments, a final predetermined pressure is no more than about 10,000 psi, about 12,000 psi, about 14,000 psi, about 15,000 psi, about 20,000 psi, or about 25,000 psi, or about 30,000 psi. In some embodiments, a final predetermined pressure is about 10,000 psi to about 14,000 psi, about 11,000 psi to about 13,000 psi, or about 11,500 psi to about 12,500 psi.

Referring to FIGS. 3-6, several exemplary embodiments of the velocity fuse 140 are depicted. In some embodiments, the velocity fuse 140 can be in a substantially horizontal orientation 142 and include a body 134 forming a chamber 134, a first end 143, a second end 145, and a poppet 146 or a dart 146 as depicted in FIG. 3. The body 134 forming a passageway 138 and a sealing surface 147, such as a seat 147. The poppet 146 or the dart 146 can have a cone 150 with a vertex 152 and a base 154. Optionally, a first spring 156 can be seated at the first end 143 and a second spring 157 can be seated at the second end 145. In some embodiments, no spring is present. If present, the springs 156 and 157 can bias the poppet 146 or the dart 146 in a center 148 of the passageway 138. The poppet 146 or the dart 146 can be a moveable sealing member.

In typical operation, the poppet 146 can be centered in the passageway 138. Fluid flowing from left to right with reference to FIG. 3 can push the poppet 146 downstream with the spring 156 biasing the poppet 146 toward the center 148. If an upset occurs with fluid flow above a threshold and in the opposite direction, the poppet 146 can be positioned against the seat 147 to prevent fluid flow upstream of the velocity fuse 140. After the upset, the poppet 146 can return centered in the passageway 138 by the expansion of the spring 156. In such a manner, the poppet 146 can remain centered in the passageway 138 during pressure tests, because the pressure tests occur at low flow rates and do not dislodge the poppet 146.

As an example, the single pump 64 can pressure the entire system 10 during a pressure test. The velocity fuse 140 downstream of the operating pump 64 can allow fluid to flow to the discharge manifold 124 and back upstream to the, e.g., discharge flowlines 116 and 118. The low-flow, pressurized fluid can pass the velocity fuse 140 upstream and pressurize all the fluid ends of each non-operating pump 84, 86, 104, and 106. Similarly, the pump fluid end of the pump 66 can be in communication with the non-operating pump 64 via the fluid outlet 70. Pressurized fluid can pass from the fluid outlet 70 past a velocity fuse to pressurize the pump fluid end of the pump 66. If an upset occurs, e.g., rapidly increasing backflow from the wellhead 18 toward the plurality of pumping units 60, the poppet 146 of each velocity fuse can move upstream so the poppet 146 can contact the seat 147 and seal and isolate the plurality of pumping units 60 from a surge in pressure and flow.

Referring to FIG. 4, velocity fuse 140 is substantially similar as depicted in FIG. 3, except the orientation is substantially vertical instead of substantially horizontal. As depicted in FIG. 4, the velocity fuse 140 can be positioned about the center 148 of the passageway 138 with a stop 158 coupled to the second end 145 engaging a catch 160. Particularly, the stop 158 rests on the catch 160 to center the poppet 146 within the passageway 138. During normal operation or an operating pump during a pressure test, the fluid flow, as indicated by the arrows, passes past the poppet 146 and presses the stop 158 against the catch 160. During an upset when an upstream flow exceeds a flow threshold, as discussed above, the poppet 146 can be pressed against seat 147. After the flow dissipates, the optional spring 156 can expand and allow the poppet 146 to drop and the stop 158 can come to rest against the catch 160. During a pressure test, the fluid flow from another pump does not dislodge the poppet 146 so the fluid flows past the poppet 146 to the fluid outlet of the upstream pump.

Referring to FIG. 5, another embodiment of a velocity fuse 140 can include the body 134, a flapper valve 162, which can serve as a movable sealing member, includes the body 134, the first end 143 and the second end 145 being at least part of the flapper valve 162. The body 134 can contain the passageway 138 and be formed integrally with a stop 164 and provide a sealing surface or a seat 164.

During normal operation or an operation pump during a pressure test, fluid can flow downstream from a pumping unit towards the wellhead 18. The flapper valve 162 can be biased open permitting fluid flow. During an upset, a fluid flow exceeding a threshold passing upstream can cause the flapper valve 162 to engage the stop 164 and prevent flow upstream. During a pressure test, another pumping unit can be operational while the pumping unit upstream of the flapper valve 162 can be idle. Fluid flow from the operational pumping unit can flow downstream to the manifold 120 and upstream pass the flapper valve 162. The fluid flow, although pressurized, will be in an amount insufficient to close the flapper valve 162. In this manner, fluid can flow past the velocity fuse 140 and upstream to the fluid outlet of the corresponding pump of the pumping unit. In this manner, the fluid outlet of the pump can be pressure tested without having to operate all the pumps. Referring to FIG. 6, the velocity fuse 140 is substantially similar to the velocity fuse 140 depicted in FIG. 3, except the velocity fuse 140 is in a substantially vertical orientation 144.

Figure 7:
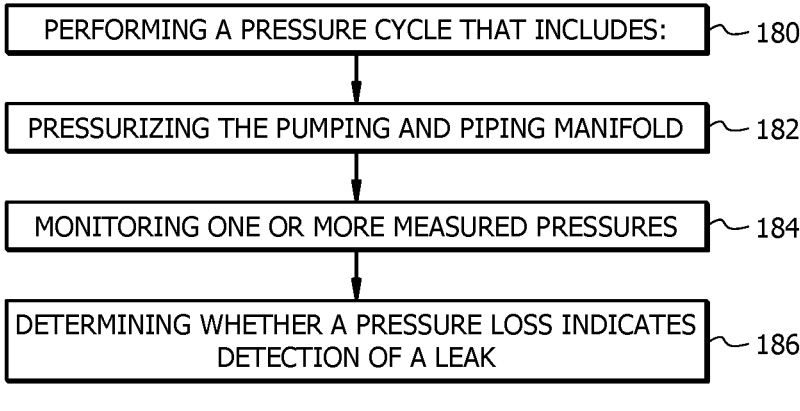
FIG. 7 is a flowchart of an embodiment of a method of conducting a pressure test.

Referring to FIG. 7, a pressure test can include performing a pressure cycle 180. The pressure cycle 180 can include pressurizing the pumping and piping manifold 182, monitoring one or more measured pressures 184, and determining whether a pressure loss is indicative of a leak 186. Generally, the pressure test is conducted on the pumping and piping manifold 40 that includes fluid outlets 70, 90, and 100, the discharge flowlines 114, 116, and 118, manifold 120, the manifold outlet line 126, and the one or more lines, such as the wellhead flowline 130, to the closed valve 178. Although the body is depicted as hexagonal in cross-section in FIGS. 3-6, the body can have any suitable shape, including silo-shaped as depicted in FIG. 2.

Figure 8:
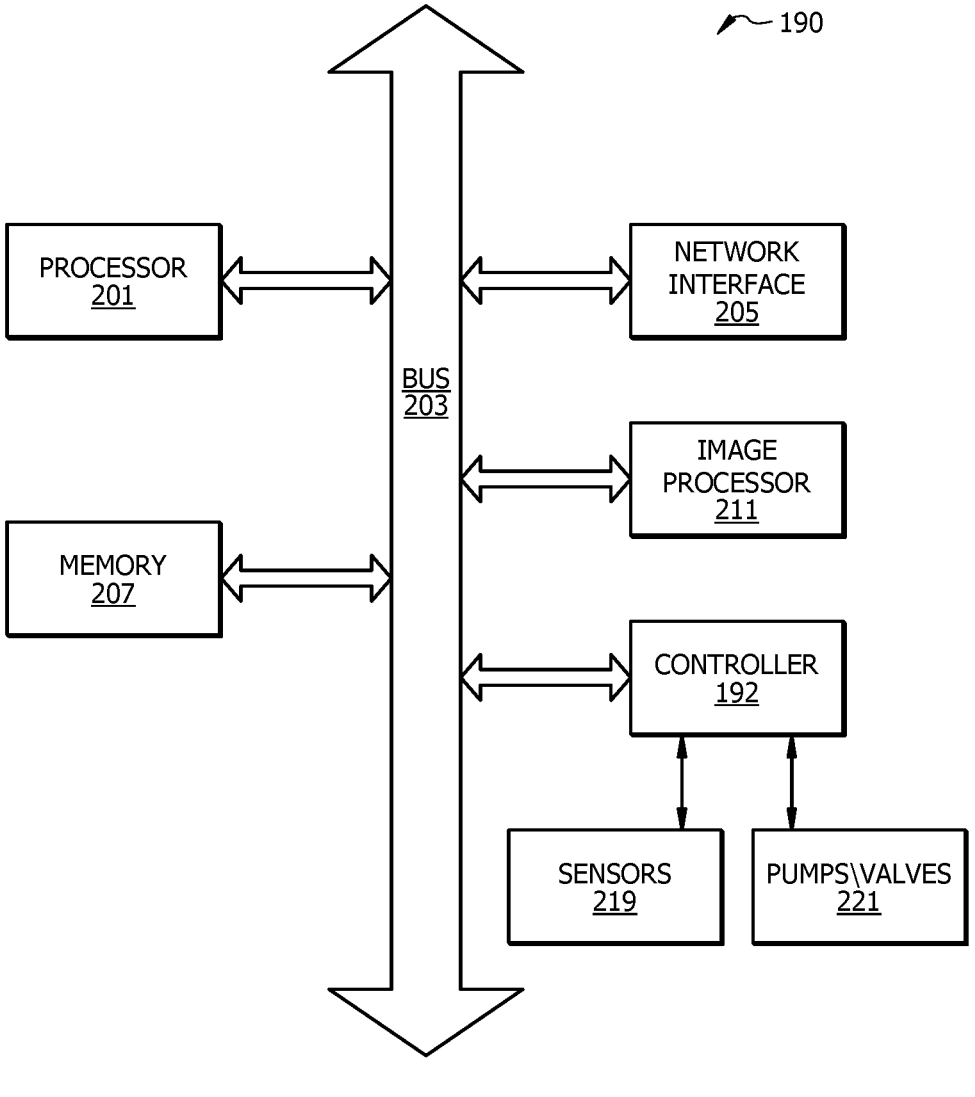
FIG. 8 is a block diagram of an embodiment of a computer system for implementing a pressure test.

Referring to FIG. 8, in some embodiments the computing system 190 may be a general-purpose computer, and includes a processor 201 (possibly including multiple processors, multiple cores, multiple nodes, and/or implementing multi-threading, etc.). The computer can include a memory 207. The memory 207 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the possible realizations of machine-readable media. The computer system also includes a bus 203 (e.g., PCI, ISA, PCI-Express, HyperTransport® bus, InfiniBand® bus, NuBus, etc.) and a network interface 205 (e.g., a Fiber Channel interface, an Ethernet interface, an internet small computer system interface, SONET interface, wireless interface, etc.).

The computer may also include an image processor 211 and a controller 192. The controller 192 can control the different operations that can occur in the response inputs from the sensors 219 and/or calculations based on inputs from the sensors 219 (such as the sensors 170, 172, 174, and 176 of the system 10, as depicted in FIG. 1) using any of the techniques described herein, and any equivalents thereof, to provide outputs to control the pumps/valves 221. For example, the controller 192 can communicate instructions to the appropriate equipment, devices, etc. to alter control number and/or the horsepower setting use by pumps, (such as the pumps 64, 66, 84, 86, 104, and 106, as depicted in FIG. 1) and/or to set and control valves (such as the valve 128 as illustrated in FIG. 1) that may be utilized in an automatic pressure testing procedure. Any one of the previously described functionalities may be partially (or entirely) implemented in hardware and/or on the processor 201. For example, the functionality may be implemented with an application specific integrated circuit, in logic implemented in the processor 201, in a co-processor on a peripheral device or card, etc. Further, realizations may include fewer or additional components not illustrated in FIG. 8 (e.g., video cards, audio cards, additional network interfaces, peripheral devices, etc.). As illustrated in FIG. 8, the processor 201 and the network interface 205 are coupled to the bus 203. Although illustrated as also being coupled to the bus 203, the memory 207 may be coupled to the processor 201 only, or both the processor 201 and bus 203.

The controller 192 may be coupled to the sensors 219 and to the pumps/valves 221 using any type of wired or wireless connection(s), and may receive data, such as measurement data, obtained by the sensors 219 or provided by the pumps/valves 221. The sensors 219 may include any of the sensors associated with a wellbore environment, including but not limited to the pressure sensors configured to output signals indicative of pressure level within a pumping and piping manifold 40. Measurement data may include any of the data associated with an automatic pressure testing procedure. The controller 192 may include circuitry, such as analog-to-digital (A/D) converters and buffers that allow the controller 192 to receive electrical signals directly from one or more of the sensors 219.

The processor 201 may be configured to execute instruction that provide control over an automatic pressure testing procedure as described in this disclosure, and any equivalents thereof. For example, the processor 201 may control operations of one or more pumps being utilized to pressurize the pumping and piping manifold 40 as part of an automatic pressure testing procedure. Control of pumps may include determining a set of predefined pump configurations, wherein a particular one of the predefined pump configurations are assigned to be used during each of a plurality of pressure testing cycles, and providing output signal, for example to controller(s) located at the pumps, to configure and control the operations of the pumps at each pressure testing cycle according to the predefined pump configuration that is to be applied to that particular pressure testing cycle. The processor 201 may also be configured to receive output signals generated by the sensors 219, to process the signals to generate pressure level data, and to utilize that pressure level data to determine if a leak or leaks have been detected as a result of the pressure testing procedure. The processor 201 may also be configured to support any interaction between a system user and the computer system 190, including generating for display output information related to the results obtained from running an automatic pressure testing procedure on the pumping and piping manifold 40, and receive and process inputs provide by a system user to the computer system 190, for example regarding how to proceed with the automatic pressure testing procedure when leaks are detected by the procedure.

With respect to the computing system 190, the basic features here may easily be substituted for improved hardware or firmware arrangements as they are developed. In some examples, the memory 207 includes non-volatile memory and can be a hard disk or other types of computer readable media which can store data that are accessible by a computer, such as magnetic cassettes, flash memory cards, solid state memory devices, digital versatile disks (DVDs), cartridges, RAM, ROM, a cable containing a bit stream, and hybrids thereof.

It will be understood that one or more blocks of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus. As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. While depicted as a computing system 190 or as a general purpose computer, some embodiments can be any type of device or apparatus to perform operations described herein.

Automatic pressure testing procedures performed by for the system 10 may be controlled at least in part by the computer system 190. The computer system 190 may include one or more processors, which for simplicity are hereinafter referred to as the processor 201. The processor 201 is not limited to any particular type of processor, and may include multiple processors and/or different types of processors, such as a general processor and an image processor. The processor 201 may be coupled to memory, (such as the memory 207 as shown in FIG. 8), that stores programs, algorithms, and parameter values that the processor 201 operates on to perform the automatic pressure testing procedures performed for a pressure test. The computer system 190 may include the display 196, which may be an interactive display such as a touch screen. The computer system 190 may including one or more I/O devices 198, such as but not limited to a computer keyboard, a computer mouse, or other known devices that allow a system operator, such as a technician or engineer, to interact with the computer system 190.

The computer system 190 may also include the one or more sets of communication links 194. For example, the communication links 194 may be configured to communicatively couple the computer system 190 to the pumps 64, 66, 84, 86, 104, and 106, for example to communicate with the controllers 160, 162, and 164 located at the pumping units 62, 82, and 102. The communication link(s) 194 may also provide the computer system 190 with communication capabilities that allow the computer system 190 to have control over the valves, such as the valve 128. The communication link 194 may be configured to communicatively couple the computer system 190 to the sensors 170, 172, 174, and 176, for example to receive electrical signal outputs corresponding to pressure sensor reading being made by these sensors 170, 172, 174, and 176. The communication links 194 may be configured to communicatively couple computer system 190 to devices located at the manifold 120, for example to control the coupling and decoupling functions that may be provided by these control valves. The communication links 194 are not limited to any particular type of communication link, communication medium, or communication formats, and may include any combination of communication links, mediums, and formats determined to be appropriate for use in the wellbore environment where the pressure test may be utilized.

The computer system 190 may be configured to control or provide control commands to the controllers 160, 162, 164 of the pumps 64, 66, 84, 86, 104, and 106 to control the operation of the pumps in conjunction with control valves to automatically perform one continuous pressure cycle, or two or more discontinuous pressure cycles. In addition, the computer system 190 may be configured to receive the output signals provided by the sensors 170, 172, 174, and 176, and other sensors that may be part of the pressure test. By controlling and monitoring these devices, the computer system 190 may perform an automatic pressure testing procedure on the pumping and piping manifold 40 as illustrated and described with respect to FIG. 1, using various predefined test parameters and test values to render a leak test status.

ADDITIONAL DISCLOSURE

The following are non-limiting, specific embodiments in accordance with the present disclosure:

A first embodiment, which is a method of conducting a pressure test on a piping and manifold system 40 configured to provide fluid flow from a plurality of pumping units 60 into a well 24 via a wellhead 18, comprises: connecting the plurality of pumping units 60 to a discharge manifold 124, wherein a fluid outlet 70, 90, and 110 on each of the plurality of pumping units 60 is in fluid communication with the discharge manifold 124 via a discharge flowline 114; connecting the wellhead 18 of a well 24 to the discharge manifold 124 via a wellhead flowline 130; isolating the wellhead 18 from fluid flow into the well 24 (by closing a valve 178 on or upstream from the wellhead 18) to form a closed test system 50; and operating at least one (e.g., just one) and less than all of the plurality of pumping units 60 to pressurize the closed test system 50 to a predetermined pressure, wherein fluid flows from the fluid outlet 70, 90, and 110 on each operating pumping unit 62, 82, and 102 (e.g., just one) through the discharge manifold 124 to the fluid outlet 70, 90, and 110 on one or more non-operating pumping units 64, 66, 84, 86, 104 and/or 106.

A second embodiment which is the method of the first embodiment, wherein each discharge flowline 114, 116, and 118 comprises a velocity fuse 140 located between the discharge manifold 124 and the fluid outlet 70, 90, and 110 of each of the plurality of pumping units 60.

A third embodiment which is the method of the first embodiment or the second embodiment, wherein a portion 74 of the discharge line located between the velocity fuse 140 and the pump fluid end 76 of each non-operating pump 64, 66, 84, 86, 104, and/or 106 is pressurized to the predetermined pressure.

A fourth embodiment which is the method of any of the proceeding embodiments, wherein each velocity fuse 140 remains open to fluid flow continuously during the pressure test.

A fifth embodiment which is the method of any of the proceeding embodiments, wherein each velocity fuse 140 remains open to fluid flow in a direction from the discharge manifold 124 to the fluid out of each non-operating pump 64, 66, 84, 86, 104, and/or 106.

A sixth embodiment which is the method of any of the proceeding embodiments, wherein each fluid outlet 70, 90, and 110 on the one or more pumping units 60 is in fluid communication with one or more pump fluid ends 70, 90, and 110 (e.g., a fluid end 70 having a plurality of reciprocating plungers disposed within corresponding fluid bores such as a triplex plunger pump or a quintuplex plunger pump).

A seventh embodiment which is the method of any of the proceeding embodiments, wherein each velocity fuse 140 remains at least partially open when there is no fluid flow through the velocity fuse 140.

An eighth embodiment which is the method of any of the proceeding embodiments, wherein each velocity fuse 140 closes in response to equal to or less than 5 gpm fluid flow through the velocity fuse 140.

A ninth embodiment which is the method of any of the proceeding embodiments, wherein each velocity fuse 140 is not biased to an open or closed position by a force other than gravity.

A tenth embodiment which is the method of any of the proceeding embodiments, wherein each velocity fuse 140 is not biased to an open or closed position by a force provided by a biasing member (e.g., a spring).

An eleventh embodiment which is the method of any of the proceeding embodiments, wherein each velocity fuse is biased to a partially open position by a force provided by a biasing member 156, 157, and/or 162 (e.g., a spring 156 and/or 157).

A twelfth embodiment which is the method of any of the proceeding embodiments, wherein each velocity fuse 140 comprises a body 134 comprising a sealing surface 147 (e.g., seat) and a moveable sealing member 146 configured to contact the sealing surface 147 in a closed position and not contact the sealing surface 147 in an open or partially open position.

A thirteenth embodiment which is the method of any of the proceeding embodiments, wherein the moveable sealing member 146 is a flapper 162, a dart, or a poppet 146.

A fourteenth embodiment which is the method of any of the proceeding embodiments, wherein each velocity fuse 140 remains open when there is no differential pressure across the sealing surface 147 and the moveable sealing member 146.

A fifteenth embodiment which is the method of any of the proceeding embodiments, wherein each velocity fuse 140 has a first end 143 and a second end 145, wherein the velocity fuse 140 is arranged in a vertical orientation 144 wherein the first end 143 is above the second end 145, and wherein the first end 143 is in fluid communication with the fluid outlet 70 of each of the plurality of pumping units 60 and the second end 145 is in fluid communication with the discharge manifold 124.

A sixteenth embodiment which is the method of any of the proceeding embodiments, wherein the sealing surface 147 is proximate the first end 143 and above the moveable sealing member 146.

A seventeenth embodiment which is the method of any of the proceeding embodiments, wherein each velocity fuse 140 has a first end 143 and a second end 145, wherein the velocity fuse 140 is arranged in a horizontal orientation 142, and wherein the first end 143 is in fluid communication with the fluid outlet 70 of each of the plurality of pumping units 60 and the second end 145 is in fluid communication with the discharge manifold 124.

An eighteenth embodiment which is the method of any of the proceeding embodiments, wherein the sealing surface 147 is proximate the first end 143 and between the moveable sealing member 146 and the fluid outlet 70.

A nineteenth embodiment which is the method of any of the proceeding embodiments, wherein at least one of the operating pumping units 60 (e.g., just one) is electrically driven.

A twentieth embodiment, which is a method of conducting a pressure test, comprises: isolating a pumping and piping system 40 coupled to a wellhead 18 of a well 24 to form an isolated system 50 by closing a valve 178 to prevent fluid flow through the wellhead 18 and into the well 24, wherein the pumping and piping system 40 comprises a plurality of pumping units 60, each of the plurality of pumping units 60 is in fluid communication with a discharge manifold 124 via a discharge flowline 114, and the discharge manifold 124 is coupled to the wellhead 18 via a wellhead flowline 130; and pressuring the isolated system 50 to a predetermined pressure with a fluid by operating less than all of the plurality of pumping units 60, wherein fluid flows from the operating pumping units 60 through the discharge manifold 124 to one or more non-operating pumping units 62, 82, and/or 102, wherein each discharge flowline 114 comprises a velocity fuse 140 located between the discharge manifold 114 and each of the plurality of pumping units 60.

A twenty-first embodiment, which is an isolated pressurized test system 50, comprises: an isolated piping and manifold system 40 coupled via a wellhead flow line 130 to a wellhead 18 of a well 24 and having a closed valve 178 to prevent fluid flow from the wellhead flowline 130 through the wellhead 18 and into the well 24, wherein the piping and manifold system 40 comprises respective fluid outlets 70, 90, and 110 of a plurality of pumping units 60, and each of the respective fluid outlets 70, 90, and 110 is in fluid communication via a discharge flowline 114 with a discharge manifold 124 (e.g., a high pressure discharge manifold having a pressure of equal to or greater than about 1,000 psi, about 5,000 psi, about 10,000 psi, or about 15,000 psi) coupled via the wellhead flowline 130 to the wellhead 18, and wherein the isolated pressurized test system 50 is pressured to a predetermined pressure with a fluid by operation of less than all of the plurality of pumping units 60 (e.g., an electrically driven plunger pump), wherein during pressurization fluid flows from one or more operating pumping units 60 through the discharge manifold 124 past a velocity fuse 140 to one or more non-operating pumping units 62, 82, and/or 102.

A twenty-second embodiment which is a method of performing a pressure test, comprises: performing at least one pressure cycle on a fluid distribution system 10 comprising a plurality of pumping units 60 coupled to a wellhead 18 via a manifold 120; isolating the wellhead 18 to provide an isolated fluid distribution system 10; and pressurizing the fluid distribution system 10 with a single pump 64 from the plurality of pumping units 60 from an initial test pressure to a final test pressure.

A twenty-third embodiment which is the method of the twenty-second embodiment, wherein the fluid distribution system 10 comprises a pumping and piping manifold 40 comprising a discharge line 70, 90, and 110 having a velocity fuse 140 for each of the plurality of pumping units 60, the manifold 120, and one or more pipes to an isolation valve 178 upstream of the wellhead 18 wherein backflow is permitted during the pressure test from the manifold 120 to at least one discharge 70, 90, and 110 for pressure testing.

A twenty-fourth embodiment which is the method of the twenty-second embodiment or twenty-third embodiment, wherein each pumping unit 62, 82, 102 of the plurality of pumping units 60 comprises a respective discharge 70, 90, and 110 containing a velocity fuse 140 activated when a flow threshold is exceeded for preventing backflow.

A twenty-fifth embodiment which is the method of any of the twenty-second embodiment through twenty-fourth embodiment, wherein each discharge 70, 90, 102 comprises the velocity fuse 140 comprising a poppet 146 centered in a passageway 138 of the discharge 70.

A twenty-sixth embodiment which is the method of any of the twenty-second embodiment through twenty-fifth embodiment, wherein the poppet 146 is biased about a center 148 of the passageway 138.

A twenty-seventh embodiment which is the method of any of the twenty-second embodiment through twenty-sixth embodiment, wherein the poppet 146 comprises a cone 150 and springs 156 are fitted proximate to a vertex 152 and a base 154 of the cone 150.

A twenty-eighth embodiment which is the method of any of the twenty-second embodiment through twenty-seventh embodiment, wherein each discharge 70 comprises the velocity fuse 140 comprising a flapper valve 162 centered in a passageway 138 of the discharge 70.

A twenty-ninth embodiment which is the method of any of the twenty-second embodiment through twenty-eighth embodiment, wherein the velocity fuse 80 is orientated substantially vertically 144.

A thirtieth embodiment which is the method of any of the twenty-second embodiment through twenty-ninth embodiment, wherein the velocity fuse 140 is orientated substantially horizontally 142.

A thirty-first embodiment which is the method of any of the twenty-second embodiment through thirtieth embodiment, wherein the pumping and piping manifold 40 comprises the plurality of pumping units 60 in fluid communication with the wellhead 18 via a manifold 120.

A thirty-second embodiment which is the method of any of the twenty-second embodiment through thirty-first embodiment, wherein the discharge 70 of each pumping unit 62 is in direct fluid communication with the manifold 120.

A thirty-third embodiment which is the method of any of the twenty-second embodiment through thirty-second embodiment, wherein a single pumping unit 62 is activated for performing the at least one pressure cycle.

A thirty-fourth embodiment which is the method of any of the twenty-second embodiment through thirty-third embodiment, wherein each of the plurality of pumping units 60 comprises a motor 72 and at least one pump 64.

A thirty-fifth embodiment which is the method of any of the twenty-second embodiment through thirty-fourth embodiment, wherein the motor 72 comprises an electric motor.

A thirty-sixth embodiment which is the method of any of the twenty-second embodiment through thirty-fifth embodiment, wherein the motor 72 comprises a diesel engine.

A thirty-seventh embodiment which is the method of any of the twenty-second embodiment through thirty-sixth embodiment, wherein the at least one pressure cycle is conducted on a closed system 50.

A thirty-eighth embodiment which is the method of any of the twenty-second embodiment through thirty-seventh embodiment, wherein a fluid is pressurized and comprises an aqueous fluid.

A thirty-ninth embodiment which is the method of any of the twenty-second embodiment through thirty-eighth embodiment, wherein the plurality of pumping units 60 and the manifold 120 are above a surface 20.

A fortieth embodiment which is the method of any of the twenty-second embodiment through thirty-ninth embodiment, wherein the single pump 64 is comprised in a pumping unit 62.

A forty-first embodiment which is the method of any of the twenty-second embodiment through fortieth embodiment, wherein the flow threshold is no more than about five gallons per minute.

A forty-second embodiment which is the method of any of the twenty-second embodiment through forty-first embodiment, wherein the predetermined pressure is about 3,000 to 5,000 psi.

A forty-third embodiment which is the method of any of the twenty-second embodiment through forty-second embodiment, wherein a maximum pressure is up to about 30,000 psi.

A forty-fourth embodiment which is the method of any of the twenty-second embodiment through forty-third embodiment, wherein a maximum pressure is no more than about 20,000 psi.

A forty-fifth embodiment which is the method of any of the twenty-second embodiment through forty-fourth embodiment, wherein a maximum pressure is about 10,000 psi to about 14,000 psi.

A forty-sixth embodiment which is the method of any of the twenty-second embodiment through forty-fifth embodiment, wherein the single pump 64 performs the pressure test and the remaining discharges 90 and 110 of the pumping and piping manifold 40 are pressurized during the test by backflow below a threshold from the manifold 120 by the single pump 64.

A forty-seventh embodiment, which is a pumping and piping manifold 40, comprises: a plurality of pumping units 60 in fluid communication with a wellbore 22 via a manifold 120, wherein each pumping unit 62 comprises a discharge 70 containing a velocity fuse 140 therein, wherein the velocity fuse 140 is open unless a threshold flow is reached.

A forty-eighth embodiment which is the pumping and piping manifold 40 of the forty-seventh embodiment, wherein the velocity fuse 140 comprises a poppet 146 or a flapper valve 162.

A forty-ninth embodiment which is the pumping and piping manifold 40 of the forty-seventh embodiment or forty-eighth embodiment, wherein the velocity fuse 140 comprises the poppet 146 centrally biased inside a passageway 138 to permit flow in either direction unless a maximum threshold of backward flow is exceeded.

A fiftieth embodiment which is the method of any of the forty-seventh embodiment through forty-ninth embodiment, wherein the velocity fuse 140 comprises a flapper valve 162 biased in an open position unless a maximum threshold of backward flow is exceeded.

A fifty-first embodiment which is the method of any of the forty-seventh embodiment through fiftieth embodiment, wherein the velocity fuse is orientated substantially horizontally 142.

A fifty-second embodiment which is the method of any of the forty-seventh embodiment through fifty-first embodiment, wherein the velocity fuse 80 is orientated substantially vertically 144.

A fifty-third embodiment which is the method of any of the forty-seventh embodiment through fifty-second embodiment, wherein the plurality of pumping units 60 in fluid communication with the wellbore 22 via the manifold 120.

A fifty-fourth embodiment which is the method of any of the forty-seventh embodiment through fifty-third embodiment, wherein the discharge 70 of each pumping unit 60 is in direct fluid communication with the manifold 120.

A fifty-fifth embodiment which is the method of any of the forty-seventh embodiment through fifty-fourth embodiment, wherein each of the plurality of pumping units 60 comprises a motor 72 and at least one pump 64.

A fifty-sixth embodiment which is the method of any of the forty-seventh embodiment through fifty-fifth embodiment, wherein the motor 72 comprises an electric motor.

A fifty-seventh embodiment which is the method of any of the forty-seventh embodiment through fifty-sixth embodiment, wherein the motor 72 comprises a diesel engine.

A fifty-eighth embodiment, which is a pumping and piping manifold 40, comprises: a plurality of pumping units 60 in fluid communication with a wellbore 22 via a manifold 120, wherein each pumping unit 60 comprises a discharge 70 containing a means for preventing excessive backflow 140.

A fifty-ninth embodiment which is the pumping and piping manifold 40 of the fifty-eighth embodiment, wherein the means for preventing excessive backflow 140 comprises a velocity fuse 140.

A sixtieth embodiment which is the pumping and piping manifold 40 of the fifty-eighth embodiment or fifty-ninth embodiment, wherein the velocity fuse 140 comprises a poppet 146 or a flapper valve 162.

A sixty-first embodiment which is the pumping and piping manifold 40 of any of the fifty-eighth embodiment through sixtieth embodiment, wherein the velocity fuse 140 comprises the poppet 146 centrally biased inside a passageway 138 to permit flow in either direction unless a maximum threshold of backward flow is exceeded.

A sixty-second embodiment which is the pumping and piping manifold 40 of any of the fifty-eighth embodiment through sixty-first embodiment, wherein the velocity fuse 140 comprises the flapper valve 162 biased in an open position unless a maximum threshold of backward flow is exceeded.

A sixty-third embodiment which is the pumping and piping manifold 40 of any of the fifty-eighth embodiment through sixty-second embodiment, wherein the velocity fuse 140 is orientated substantially horizontally 142.

A sixty-fourth embodiment which is the pumping and piping manifold 40 of any of the fifty-eighth embodiment through sixty-third embodiment, wherein the velocity fuse 140 is orientated substantially vertically 144.

A sixty-fifth embodiment which is the pumping and piping manifold 40 of any of the fifty-eighth embodiment through sixty-fourth embodiment, wherein the plurality of pumping units 60 is in fluid communication with the wellbore 22 via the manifold 120.

A sixty-sixth embodiment which is the pumping and piping manifold 40 of any of the fifty-eighth embodiment through sixty-fifth embodiment, wherein the discharge 70 of each pumping unit 60 is in direct fluid communication with the manifold 120.

A sixty-seventh embodiment which is the pumping and piping manifold 40 of any of the fifty-eighth embodiment through sixty-sixth embodiment, wherein each of the plurality of pumping units 60 comprises a motor 72 and at least one pump 64.

A sixty-eighth embodiment which is the pumping and piping manifold 40 of any of the fifty-eighth embodiment through sixty-seventh embodiment, wherein the motor 72 comprises an electric motor.

A sixty-ninth embodiment which is the pumping and piping manifold 40 of any of the fifty-eighth embodiment through sixty-eighth embodiment, wherein the motor 72 comprises a diesel engine.

A seventieth embodiment which is the pumping and piping manifold 40 of any of the fifty-eighth embodiment through sixty-ninth embodiment, wherein the excessive backflow exceeds five gallons per minute.

A seventy-first embodiment which is a hydraulic fracturing spread 10 comprises the pumping and piping manifold 40 of any of the fifty-eighth embodiment through seventieth embodiment.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k^*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as includes, includes, having, etc. should be understood to provide support for narrower terms such as consisting of, consisting essentially of, included substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A method of conducting a pressure test on a piping and manifold system configured to provide fluid flow from a plurality of pumping units into a well via a wellhead, comprising:

connecting the plurality of pumping units to a discharge manifold, wherein a fluid outlet on each of the plurality of pumping units is in fluid communication with the discharge manifold via a discharge flowline;

connecting the wellhead of a well to the discharge manifold via a wellhead flowline;

isolating the wellhead from fluid flow into the well to form a closed test system; and operating at least one and less than all of the plurality of pumping units to pressurize the closed test system to a predetermined pressure, wherein fluid flows from the fluid outlet on each operating pumping unit through the discharge manifold to the fluid outlet on one or more non-operating pumping units.

2. The method of claim 1 wherein each discharge flowline comprises a velocity fuse located between the discharge manifold and the fluid outlet of each of the plurality of pumping units.

3. The method of claim 2 wherein a portion of the discharge line located between the velocity fuse and the pump fluid end of each non-operating pump is pressurized to the predetermined pressure.

4. The method of claim 2 wherein each velocity fuse remains open to fluid flow continuously during the pressure test.

5. The method of claim 2 wherein each velocity fuse remains open to fluid flow in a direction from the discharge manifold to the fluid out of each non-operating pump.

6. The method of claim 2 wherein each velocity fuse remains at least partially open when there is no fluid flow through the velocity fuse.

7. The method of claim 2 wherein each velocity fuse closes in response to equal to or less than 5 gpm fluid flow through the velocity fuse.

8. The method of claim 2 wherein each velocity fuse is not biased to an open or closed position by a force other than gravity.

9. The method of claim 2 wherein each velocity fuse is not biased to an open or closed position by a force provided by a biasing member.

10. The method of claim 2 wherein each velocity fuse is biased to a partially open position by a force provided by a biasing member.

11. The method of claim 10 wherein each velocity fuse comprises a body comprising a sealing surface and a moveable sealing member configured to contact the sealing surface in a closed position and not contact the sealing surface in an open or partially open position.

12. The method of claim 11 wherein the moveable sealing member is a flapper, a dart, or a poppet.

13. The method of claim 11 wherein each velocity fuse remains open when there is no differential pressure across the sealing surface and the moveable sealing member.

14. The method of claim 11 wherein each velocity fuse has a first end and a second end, wherein the velocity fuse is arranged in a vertical orientation wherein the first end is above the second end, and wherein the first end is in fluid communication with the fluid outlet of each of the plurality of pumping units and the second end is in fluid communication with the discharge manifold.

15. The method of claim 14 wherein the sealing surface is proximate the first end and above the moveable sealing member.

16. The method of claim 14 wherein the sealing surface is proximate the first end and between the moveable sealing member and the fluid outlet.

17. The method of claim 11 wherein each velocity fuse has a first end and a second end, wherein the velocity fuse is arranged in a horizontal orientation, and wherein the first end is in fluid communication with the fluid outlet of each of the plurality of pumping units and the second end is in fluid communication with the discharge manifold.

18. The method of claim 1 wherein each fluid outlet on the one or more pumping units is in fluid communication with one or more pump fluid ends.

19. The method of claim 1 wherein at least one of the operating pumping units is electrically driven.

20. A method of conducting a pressure test, comprising:
isolating a pumping and piping system coupled to a wellhead of a well to form an isolated system by closing a valve to prevent fluid flow through the wellhead and into the well, wherein the pumping and piping system comprises a plurality of pumping units, each of the plurality of pumping units is in fluid communication with a discharge manifold via a discharge flowline, and the discharge manifold is coupled to the wellhead via a wellhead flowline; and
pressuring the isolated system to a predetermined pressure with a fluid by operating less than all of the plurality of pumping units, wherein fluid flows from the operating pumping units through the discharge manifold to one or more non-operating pumping units,
wherein each discharge flowline comprises a velocity fuse located between the discharge manifold and each of the plurality of pumping units.

21. An isolated pressurized test system, comprising: an isolated piping and manifold system coupled via a wellhead flow line to a wellhead of a well and having a closed valve to prevent fluid flow from the wellhead flowline through the wellhead and into the well, wherein the piping and manifold system comprises respective fluid outlets of a plurality of pumping units, and each of the respective fluid outlets is in fluid communication via a discharge flowline with a discharge manifold coupled via the wellhead flowline to the wellhead, and wherein the isolated pressurized test system is configured to be pressurized to a predetermined pressure with a fluid by operation of less than all of the plurality of pumping units, wherein during pressurization fluid flows from one or more operating pumping units through the discharge manifold past a velocity fuse to one or more non-operating pumping units.

* * * * *